US012805492B2

(12) United States Patent
Dalmolin et al.

(10) Patent No.: US 12,805,492 B2
(45) Date of Patent: Nov. 24, 2026

(54) NIPPLE DRINKER FOR POULTRY WATERER WITH VARIABLE FLOWRATE

(71) Applicant: GSI Brasil Industria e Comercio de Equipamentos Agropecuarios Ltda, Marau (BR)

(72) Inventors: Emilene Dalmolin, Marau (BR); Fabrício Ferrari, Marau (BR); Robson Pauleto Camargo, Marau (BR)

(73) Assignee: GSI Brasil Industria e Comercio de Equipamentos Agropecuarios Ltda, Marau (BR)

( * ) Notice: Subject to any disclaimer, the term of this patent is extended or adjusted under 35 U.S.C. 154(b) by 0 days.

(21) Appl. No.: 19/126,844

(22) PCT Filed: Sep. 19, 2023

(86) PCT No.: PCT/IB2023/059262
§ 371 (c)(1),
(2) Date: May 2, 2025

(87) PCT Pub. No.: WO2024/095075
PCT Pub. Date: May 10, 2024

(65) Prior Publication Data

US 2026/0157351 A1 Jun. 11, 2026

(30) Foreign Application Priority Data

Nov. 2, 2022 (GB) .................................... 2216311

(51) Int. Cl.
*A01K 39/00* (2006.01)
*A01K 39/02* (2006.01)

(52) U.S. Cl.
CPC ................................ *A01K 39/0213* (2013.01)

(58) Field of Classification Search
CPC .................................................. A01K 39/0213
(Continued)

(56) References Cited

U.S. PATENT DOCUMENTS

| | | | | |
|---|---|---|---|---|
| 4,258,666 A | | 3/1981 | Edstrom | |
| 5,193,485 A | * | 3/1993 | Hostetler | A01K 39/0213 251/339 |

(Continued)

FOREIGN PATENT DOCUMENTS

| | | |
|---|---|---|
| CN | 104396793 | 3/2015 |
| CN | 104396793 A | 3/2015 |
| WO | WO2024095076 A1 | 5/2024 |

OTHER PUBLICATIONS

International Search Report and Written Opinion mailed Nov. 27, 2023 in International Application No. PCT/IB2023/059262.

(Continued)

*Primary Examiner* — Richard T Price, Jr.
(74) *Attorney, Agent, or Firm* — Ray Quinney & Nebeker

(57) ABSTRACT

A nipple drinker for use in a watering system of an animal house having at least one watering pipe, where the watering pipe carries pressurized water to the nipple drinker. The nipple drinker includes a nipple body that receives a sealing ball, a sealing bushing and a bottom pin and forms an internal flow channel from a nipple inlet and past the sealing ball when the sealing ball is displaced from the sealing bushing. The nipple body forms a flow determining shelf in the flow channel. The nipple drinker has a top pin received by the nipple body and movable in a vertical direction with respect to the nipple body. The top pin has a flow control section with differing diameter dimensions that interfaces with the flow determining shelf to control the flowrate of water that flows through the nipple drinker based on the vertical position of the top pin.

19 Claims, 11 Drawing Sheets

(58) Field of Classification Search
USPC .......................................................... 119/72
See application file for complete search history.

(56) References Cited

U.S. PATENT DOCUMENTS

| | | | | | |
|---|---|---|---|---|---|
| 5,329,877 | A | 7/1994 | Schumacher | | |
| 5,522,346 | A * | 6/1996 | Clark, IV | A01K 39/0213 | 251/339 |
| 5,857,429 | A * | 1/1999 | Hostetler | A01K 39/0213 | 119/72.5 |
| 6,748,899 | B1 * | 6/2004 | Momont | A01K 39/0213 | 251/126 |
| 2004/0244705 | A1 * | 12/2004 | Momont | A01K 39/0213 | 119/72.5 |
| 2005/0066907 | A1 * | 3/2005 | Pollock | A01K 39/0213 | 119/72.5 |

OTHER PUBLICATIONS

International Search Report and Written Opinion mailed Nov. 27, 2023 in International Application No. PCT/IB2023/059263.

Non-Final Office Action for co-pending U.S. Appl. No. 19/126,849, filed May 12, 2026.

* cited by examiner

NIPPLE DRINKER FOR POULTRY WATERER WITH VARIABLE FLOWRATE

CROSS REFERENCE TO RELATED APPLICATIONS

This application is a U.S. Nationalization of PCT Application Number PCT/IB2023/059262, filed on Sep. 19, 2023, which claims priority to United Kingdom Patent Application No. 2216311.7, filed on Nov. 2, 2022, the entireties of which are incorporated herein by reference.

BACKGROUND OF THE INVENTION

Field of Invention

This disclosure relates to poultry watering systems, and more particularly to a nipple drinker connectable to the watering system that has a variable flow rate.

Description of Related Art

Nipple drinker watering systems are commonly used to provide water to poultry and other small animals. These watering systems include a supply line which is connected to several branching watering pipes extending the interior length of a house, such as a poultry house. Each watering pipe has a series of spaced apart watering stations or nipple drinkers attached thereto. Nipple drinkers for poultry houses are activated by birds pecking against the nipple drinker to release a supply of water. The watering system is typically suspended from the roof rafters of the poultry house by a suspension system having a motorized winch and cable assembly (not shown) that is selectively operated to allow the watering system to be raised and lowered in order to fit nipple height according to bird growth. Additionally, the watering system is raised and lowered so that the poultry house may be cleaned and new bedding put down between poultry batches.

The pressure within the water watering pipes is maintained at a suitable (e.g., about 6"-12" of water) which is typically substantially less than the line pressure (e.g., 30-60 psi) in the supply line. Thus, water regulators are positioned in the watering system before the nipple drinkers. The regulators are usually placed at the beginning of the water watering pipes.

At times, it may be desirable to vary the amount of water released by the nipple drinker 102 when activated by the bird. At present, when farmers need to increase the water volume in a poultry watering line, they turn a lever at the pressure regulator of each line, increasing the pressure and so the water flow rate in each nipple drinker. With the continuous improvement of technology and the diversification of product demand, nipple drinkers having a variable flowrate would be desirable.

BRIEF SUMMARY

One aspect of the invention is directed to a nipple drinker for use in a watering system of an animal house having at least one watering pipe, where the watering pipe carries pressurized water to the nipple drinker. The nipple drinker has a sealing ball that is forced against a sealing bushing thereby forming a watertight seal to prevent leakage of water from the flow channel out through the nipple drinker. The nipple drinker has a bottom pin configured to displace the sealing ball from the sealing bushing to release drinking water through the nipple drinker. The nipple drinker includes a nipple body that receives the sealing ball, the sealing bushing and the bottom pin and forms an internal flow channel from a nipple inlet and past the sealing ball when the sealing ball is displaced from the sealing bushing. The nipple body forms a flow determining shelf in the internal flow channel. The nipple drinker has a top pin received by the nipple body and movable in a vertical direction with respect to the nipple body. The top pin has a flow control section with differing diameter dimensions that interfaces with the flow determining shelf to control the flowrate of water that flows through the nipple drinker based on the vertical position of the top pin. When the top pin is in a first vertical position there is a first flowrate of water and when the top pin is in a second vertical position, there is a second flowrate of water greater than the first flow rate.

Other technical features may be readily apparent to one skilled in the art from the following figures, descriptions, and claims. This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE SEVERAL VIEWS OF THE DRAWINGS

To easily identify the discussion of any particular element or act, the most significant digit or digits in a reference number refer to the figure number in which that element is first introduced. The disclosed subject matter will be further explained with reference to the attached figures, wherein like structure or system elements are referred to by like reference numerals throughout the several views.

DETAILED DESCRIPTION

Figure 1:
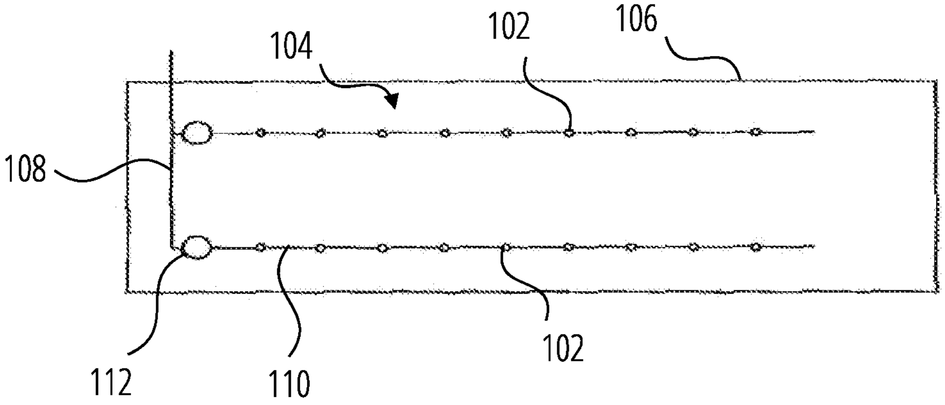
FIG. 1 is a schematic of a poultry watering system having a plurality of nipple drinkers.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

A watering system 104 for use in an animal house such as poultry house 106 is shown in FIG. 1. The watering system 104 includes a supply line 108 which is connected to at least one watering pipe 110, two of which are shown. A number of watering stations or nipple drinkers 102 are spaced along each watering pipe 110. The watering pipe 110 on which the nipple drinkers 102 are mounted has encloses a flow channel (best seen in FIG. 5A) through which water is carried to each nipple drinker 102. As is known, nipple drinkers 102 for poultry houses 106 are activated by birds pecking the nipple drinker 102 to release a supply of water. The pressure within the water watering pipes 108 is maintained at a suitable (e.g., about 6"-12" of water) which is typically substantially less than the line pressure (e.g., 30-60 psi) in the supply line 108. Thus, water regulators 112 are positioned in the watering system 104 before the nipple drinkers 102. The regulators 112 are desirably placed at the beginning of the water watering pipes 110, as schematically shown in FIG. 1. As is known, the watering system 104 is typically suspended from the roof rafters of the poultry house 106 by a suspension system having a motorized winch and cable assembly (not shown) that is selectively operated to allow the watering system 104 to be raised and lowered so that the birds can access nipple drinkers 102 according to their growth and the poultry house 106 may be cleaned and new bedding put down between poultry batches.

Figure 2:
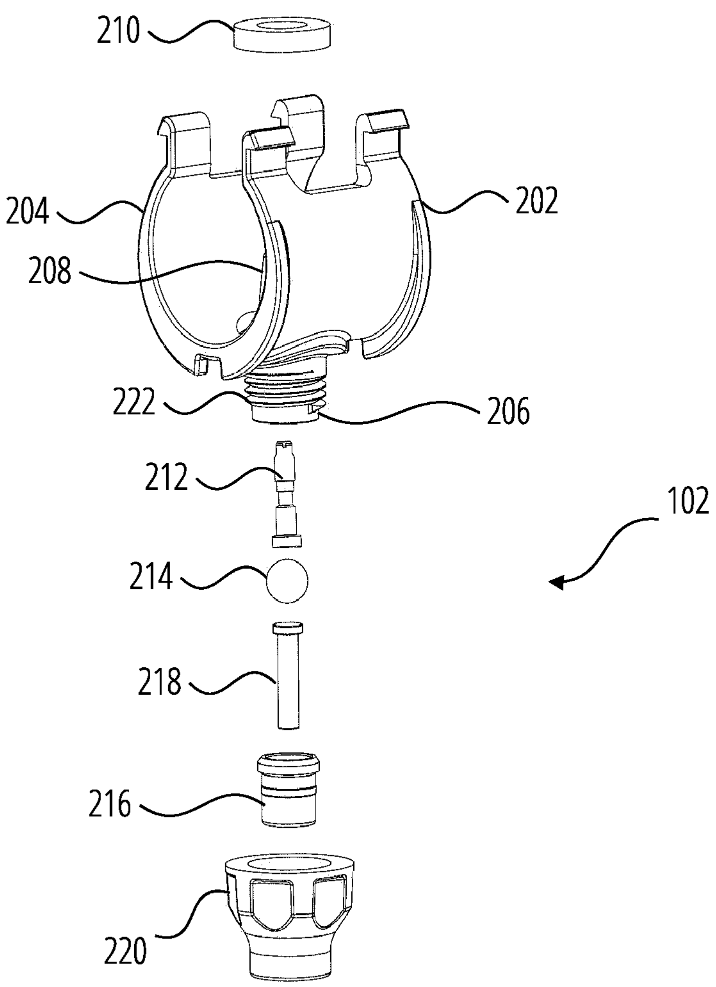
FIG. 2 illustrates an exploded view of one of the nipple drinkers of FIG. 1 in accordance with one embodiment.

Turning now to FIG. 2, each nipple drinker 102 has a drinker body 202 that engages the watering pipe 110 to mount the nipple drinker 102 on the watering pipe. In the illustrated embodiment, the drinker body 202 has side arms 204 that at least partially wrap around the watering pipe 110 to hold the nipple drinker 102 securely, but detachably, against the watering pipe 110 such that each nipple drinker 102 is detachably attached to the watering pipe 110. Other means of attaching the drinker body 202 to the watering pipe 110, such as a threaded connection as in a Lubing nipple drinker may also be used. A nipple body 206 in the lower portion of the drinker body 202 mates with and extends through an opening in the watering pipe 110 such that a nipple inlet 208 extends into the flow channel of the watering pipe 110. A waterproof sealing ring 210 aids in creating a water-tight seal between the nipple body 206 and the watering pipe 110.

Extending through an interior flow channel of the nipple body 206 is a top pin 212 that works in conjunction with the interior flow channel, as will be described below, to selectively allow a flow of water from the watering pipe 110 out the nipple drinker 102. A sealing mechanism is received in the nipple body 206 to open and close the flow channel. In one embodiment, the sealing mechanism includes a sealing ball 214 that is received adjacent a sealing bushing 216 that function to limit outward flow of water through the nipple drinker 102. The sealing ball 214 can be displaced from the sealing bushing 216 by a bottom pin 218 that is exposed to the animal desiring to utilize the nipple drinker 102. The bottom pin 218 is configured to move the sealing ball 214 away from the sealing bushing 216 and the top pin 212 upwards relative the nipple body 206 to open a pathway that allows water to flow through the nipple drinker 102. A fastening tip 220 surrounds and holds in place the bottom pin 218, the sealing ball 214 and the top pin 212 in the nipple body 206. In the illustrated embodiment, the fastening tip 220 screws onto threads 222 on the nipple body 206. Periodically, the fastening tip 220 may be removed and components of the nipple drinker 102 removed to clean out the internals of the nipple drinker 102. While the illustrated embodiment shows the nipple drinker 102 having a sealing mechanism with the sealing ball 214 that is actuated by the bottom pin 218 to move the top pin 212, the nipple drinker 102 may have other configurations for the sealing mechanism such a pin to pin connection such as in a Lubing or Plasson nipple drinker as are known in the art without departing from the scope of the invention.

When the watering pipe 110 is pressurized, the sealing ball 214 is forced against the sealing bushing 216 by the water pressure, thereby forming a watertight seal to prevent leakage of water out through the nipple drinker 102. When an animal needs to drink, the animal pecks at the bottom pin 218, thereby causing the bottom pin 218 to vertically and/or laterally displace the sealing ball 214 from the sealing bushing 216. With the sealing ball 214 temporarily separated from the sealing bushing 216, water flows along the top pin 212, around the sealing ball 214 and out the nipple drinker 102 along the bottom pin 218 to provide drinking water to the animal as would be understood by one skilled in the art.

Figure 3:
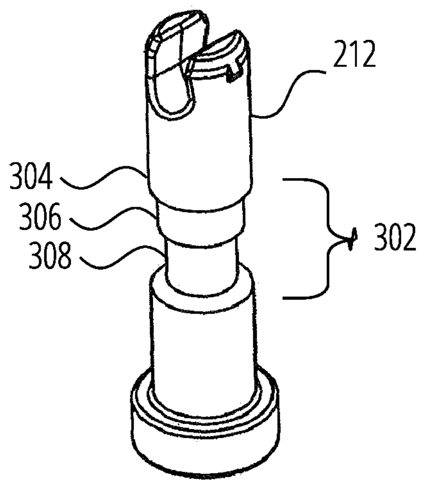
FIG. 3 illustrates a perspective view of a top pin of the nipple drinker of FIG. 2.

Turning now to FIG. 3, in one embodiment the top pin 212 has a flow control section 302 along a portion of its length that contains a plurality of vertically spaced flow control features that control the amount of water that flows through the nipple drinker 102. As the animal moves the bottom pin 218, the movement causes a vertical movement of the top pin 212. The vertical movement of the top pin 212 changes the flowrate through the nipple drinker 102 because of the difference in diameter existing in the body of top pin 212, as the difference in diameter changes the cross-sectional area of the water passage responsible for determining the flowrate.

In the illustrated embodiment, the flow control section 302 has a first flow feature 304 having a first diameter, a second flow feature 306 having a second diameter that is smaller than the first diameter, and a third flow feature 308 having a third diameter that is smaller than the second diameter. In the illustrated embodiment, the third flow feature 308 is closest to the sealing ball 214 and the first flow feature 304 is closest to the nipple inlet 208. This embodiment of the top pin 212 allows three different flowrates due to the geometry of the flow control section 302 and its dimensional differences that can be positioned to interact with a portion of the interior of the nipple body 206 to control the flowrate. While the illustrated embodiment shows a top pin 212 that has three flow features 304, 306 and 308, one skilled in the art will understand that the top pin 212 could have a different number of flow features to provide a different number of flowrates.

Figure 4A:
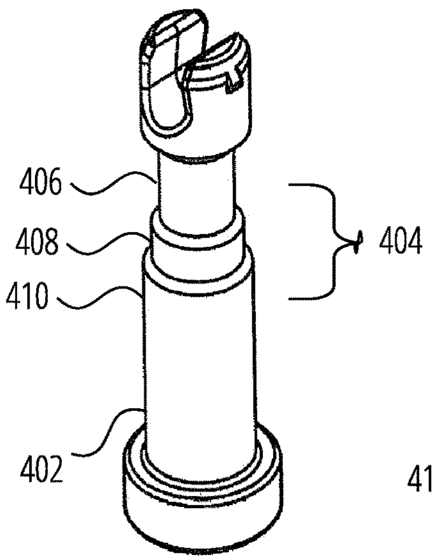
FIG. 4A illustrates another embodiment of a top pin of the nipple drinker.
Figure 4B:
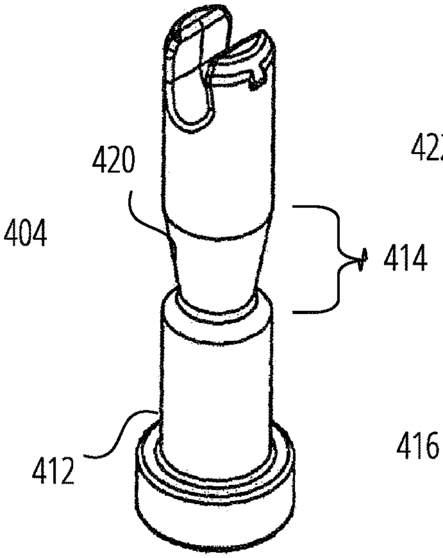
FIG. 4B illustrates another embodiment of a top pin of the nipple drinker.
Figure 4C:
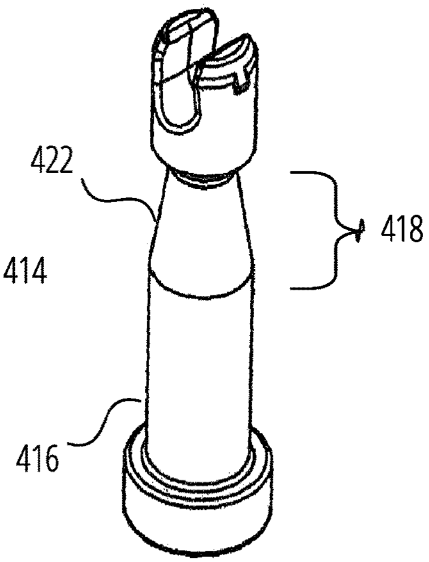
FIG. 4C illustrates another embodiment of a top pin of the nipple drinker.

FIGS. 4A, 4B and 4C illustrate different embodiments of top pins having flow control sections that allow different flow characteristics. In FIG. 4A, top pin 402 has a flow control section 404 with a first flow feature 406 having a first diameter, a second flow feature 408 having a second diameter that is larger than the first diameter, and a third flow feature 410 having a third diameter that is larger than the second diameter. In this embodiment, the third flow feature 410 is closest to the sealing ball 214 and the first flow feature 406 is closest to the nipple inlet 208. FIG. 4B illustrates a top pin 412 that has a flow control section 414 that has a progressive or ramped change in diameter rather than step changes like the top pins 212 and 402. In this embodiment, the flow control section 414 of top pin 412 has a smaller diameter closest to the sealing ball 214 and a larger diameter closest to the nipple inlet 208. FIG. 4C shows a top pin 416 that has a flow control section 418 that also has a ramped change in diameter, but in this embodiment, the flow control section 418 has a larger diameter closest to the sealing ball 214 and a smaller diameter closest to the nipple inlet 208.

Figures 5A, 5B, 5C:
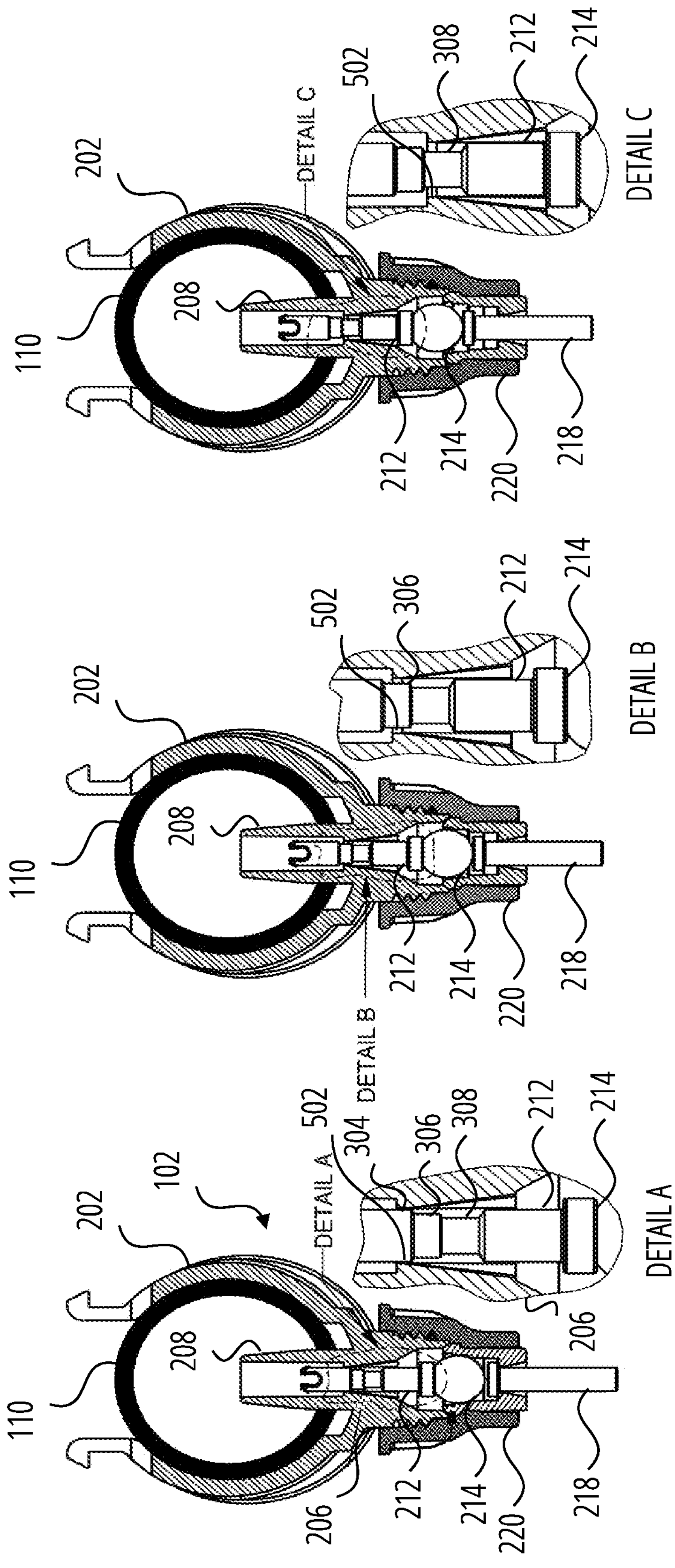
FIG. 5A illustrates a sectional view of the nipple drinker with the top pin of FIG. 3 in a first vertical position.
FIG. 5B illustrates a sectional view of the nipple drinker with the top pin in a second vertical position.
FIG. 5C illustrates a sectional view of the nipple drinker with the top pin in a third vertical position.

FIG. 5A, FIG. 5B and FIG. 5C illustrate the nipple drinker 102 showing the vertical position of the top pin 212 in three different positions such that the flow control section 302 is aligned to provide three different flowrates through the nipple drinker 102. FIG. 5A illustrates the top pin 212 vertically positioned by movement of the bottom pin 218 such that the first flow feature 304 in the flow control section 302 interfaces with a flow determining shelf 502 in the nipple body 206. As best seen in the Detail A portion of FIG. 5A, the flow determining shelf 502 is formed in the nipple body 206 so as to interact with the flow control section 302 of the top pin 212 in such a way as to form the limiting feature in the fluid passageway and thus the flowrate through the nipple drinker 102. As best seen in the enlarged detail A section of FIG. 5A, the first flow feature 304 has the largest diameter, the space between the first flow feature 304 and the flow determining shelf 502 is the smallest and the first flowrate is correspondingly small.

FIG. 5B illustrates a second condition where additional movement of the bottom pin 218 causes additional upward movement of the top pin 212 relative the flow determining shelf 502 such that the second flow feature 306 now interfaces with the flow determining shelf 502. Since the second flow feature 306 has a smaller diameter than the first flow feature 304, the flow channel past the flow determining shelf 502 allows for a second flow rate that is greater than the first flow rate.

FIG. 5C illustrates a third condition where yet additional movement of the bottom pin 218 causes additional upward movement of the top pin 212 such that the third flow feature 308 now interfaces with the flow determining shelf 502. Since the third flow feature 308 has a smaller diameter than the second flow feature 306, the flow channel past the flow determining shelf 502 allows for a third flow rate that is greater than the second flow rate.

Thus, upward vertical movement of the top pin 212 relative the flow determining shelf 502 causes an increase in the flowrate through the nipple drinkers 102.

One skilled in the art will understand that in a different embodiment the top pin 402 illustrated in FIG. 4A may alternatively be used with the nipple body 206 such that upward vertical movement of the top pin 402 relative the flow determining shelf 502 causes a decrease in the flowrate through the nipple drinker 102. In this embodiment, upward movement of the top pin 402 successively positions the first flow feature 406, the second flow feature 408 and then the third flow feature 410 of the flow control section 404 to interface with the flow determining shelf 502 to decrease the cross-sectional area of the flow channel past the flow determining shelf 502.

Figure 6:
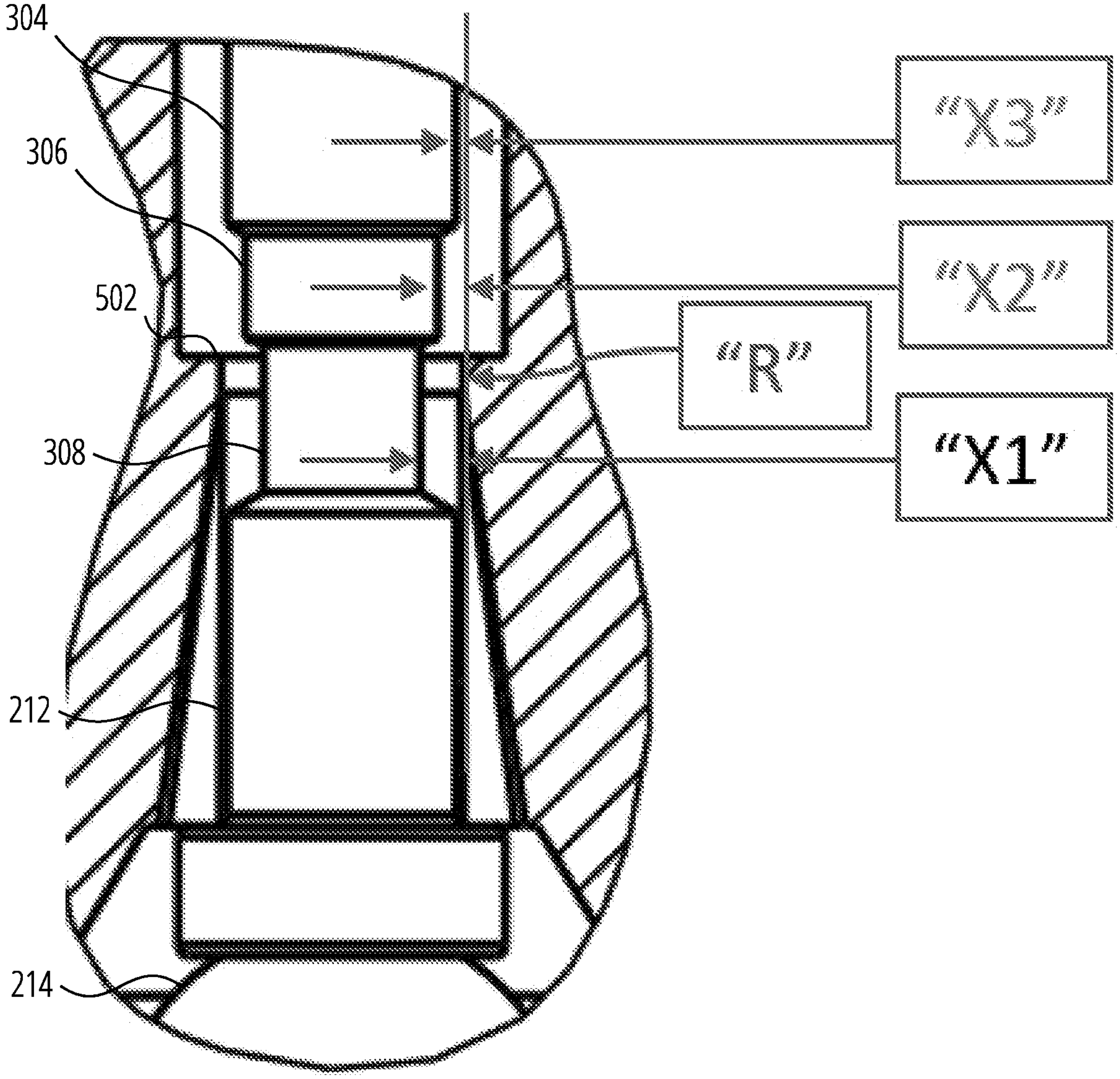
FIG. 6 illustrates an enlarged sectional view of a portion of the nipple drinker.

As perhaps better seen in the enlarged view of FIG. 6, the change in the cross-sectional area of the top pin 212 along its length in the flow control section 302 causes a distance R measured between the inner surface of the flow determining shelf 502 of the nipple body 206, which is the illustrated example is the fixed reference formed in the inner surface of the nipple body 206, and the top pin 212 to be a variable distance based on the vertical position of the top pin 212 relative to the flow determining shelf 502. In this example, when the top pin 212 is positioned such that the third flow feature 308 interfaces with the flow determining shelf 502, the distance R is equal to X1, when the top pin 212 is moved in an upward direction such that the second flow feature 306 interfaces with the flow determining shelf 502, the distance R is equal to X2, and when the top pin 212 is further moved in the upwards direction such that the first flow feature 304 interfaces with the flow determining shelf 502, the distance R is equal to X3.

Figure 7A:
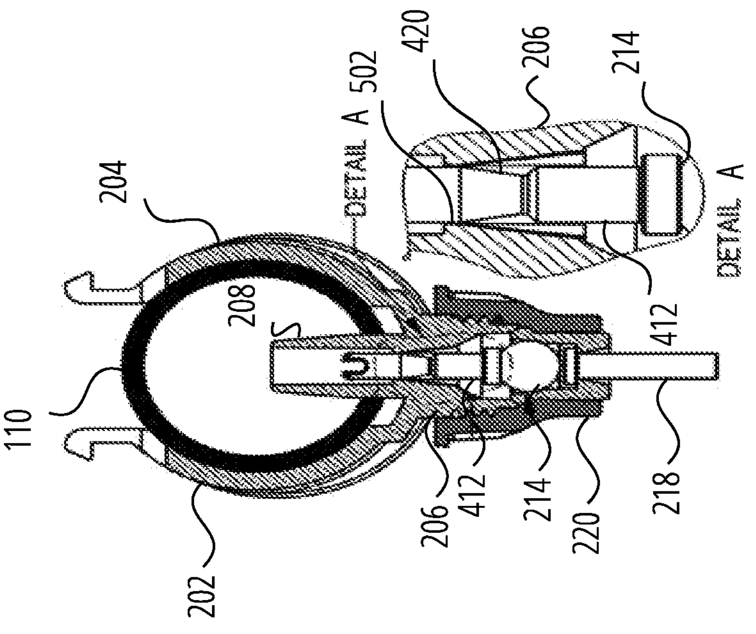
FIG. 7A illustrates a sectional view of the nipple drinker with the top pin of FIG. 4B in a first vertical position.
Figure 7B:
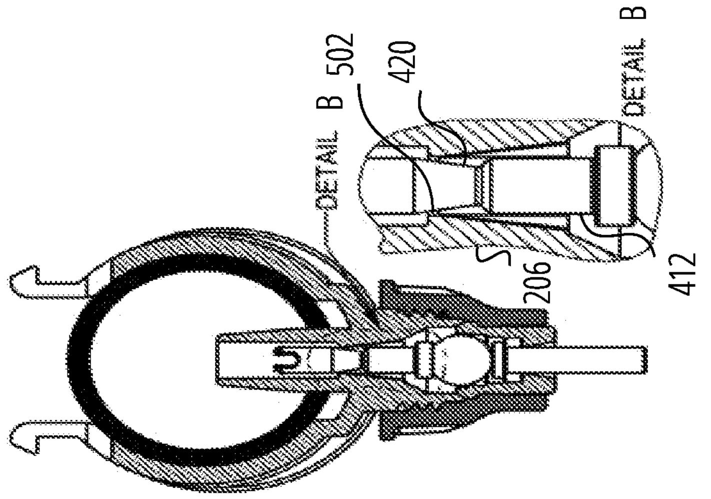
FIG. 7B illustrates a sectional view of the nipple drinker with the top pin of FIG. 4B in a second vertical position.
Figure 7C:
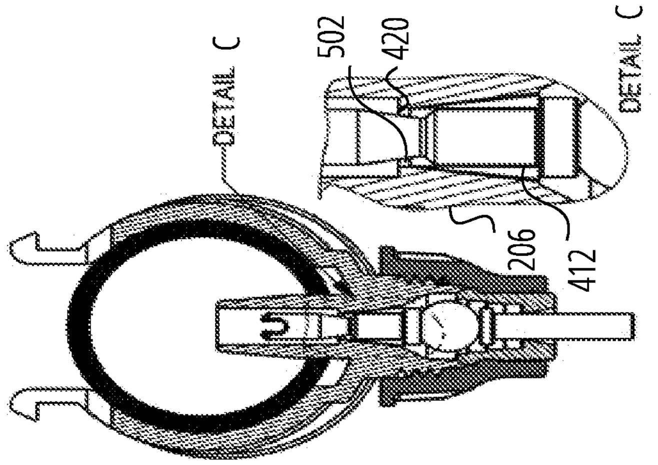
FIG. 7C illustrates a sectional view of the nipple drinker with the top pin of FIG. 4B in a third vertical position.

FIG. 7A, FIG. 7B and FIG. 7C illustrate an embodiment of the nipple drinker 102 with the vertical position of the top pin 412 (FIG. 4B) in three different positions such that the flow control section 414 is aligned to provide three different flow rates through the nipple drinker 102. In this embodiment, the flow control section 414 of the top pin 412 has a linearly variable ramp. The vertical position of the top pin 412 can produce a maximum and minimum flow, with a linear variation occurring between upper and lower ends of the flow control section 414. FIG. 7A illustrates the top pin 412 vertically positioned by movement of the bottom pin 218 such that an upper portion of the descending ramp section 420 interfaces with the flow determining shelf 502 in the fluid passageway in the nipple body 206 to provide a first flow rate. As best seen in the enlarged detail A section of FIG. 7A, the descending ramp section 420 has the largest diameter at the upper portion of the flow control section 414, and the space between the descending ramp section 420 and the flow determining shelf 502 is the smallest and the first flowrate is correspondingly small.

FIG. 7B illustrates a second condition where additional movement of the bottom pin 218 causes additional upward movement of the top pin 412 such that an intermediate portion of the descending ramp section 420 between the upper end and lower end of the flow control section 414 interfaces with the flow determining shelf 502. Since in this position the intermediate portion of the descending ramp section 420 adjacent the flow determining shelf 502 has a smaller diameter than the condition shown in FIG. 7A, the flow channel past the flow determining shelf 502 allows for a second flow rate that is greater than the first flow rate.

FIG. 7C illustrates a third condition where additional movement of the bottom pin 218 causes additional upward movement of the top pin 412 such that a lower portion of the descending ramp section 420 now interfaces with the flow determining shelf 502. Since the bottom portion of the descending ramp section 420 has a smaller diameter than the intermediate portion, the flow channel past the flow determining shelf 502 allows for a third flow rate that is greater than the second flow rate. Thus, upward vertical movement of the top pin 412 causes an increase in the flowrate through the nipple drinkers 102. One skilled in the art will understand the top pin 416 illustrated in FIG. 4C may alternatively be used with the nipple body 206 such that upward vertical movement of the top pin 416 causes a decrease in the flowrate through the nipple drinker 102.

Figure 8:
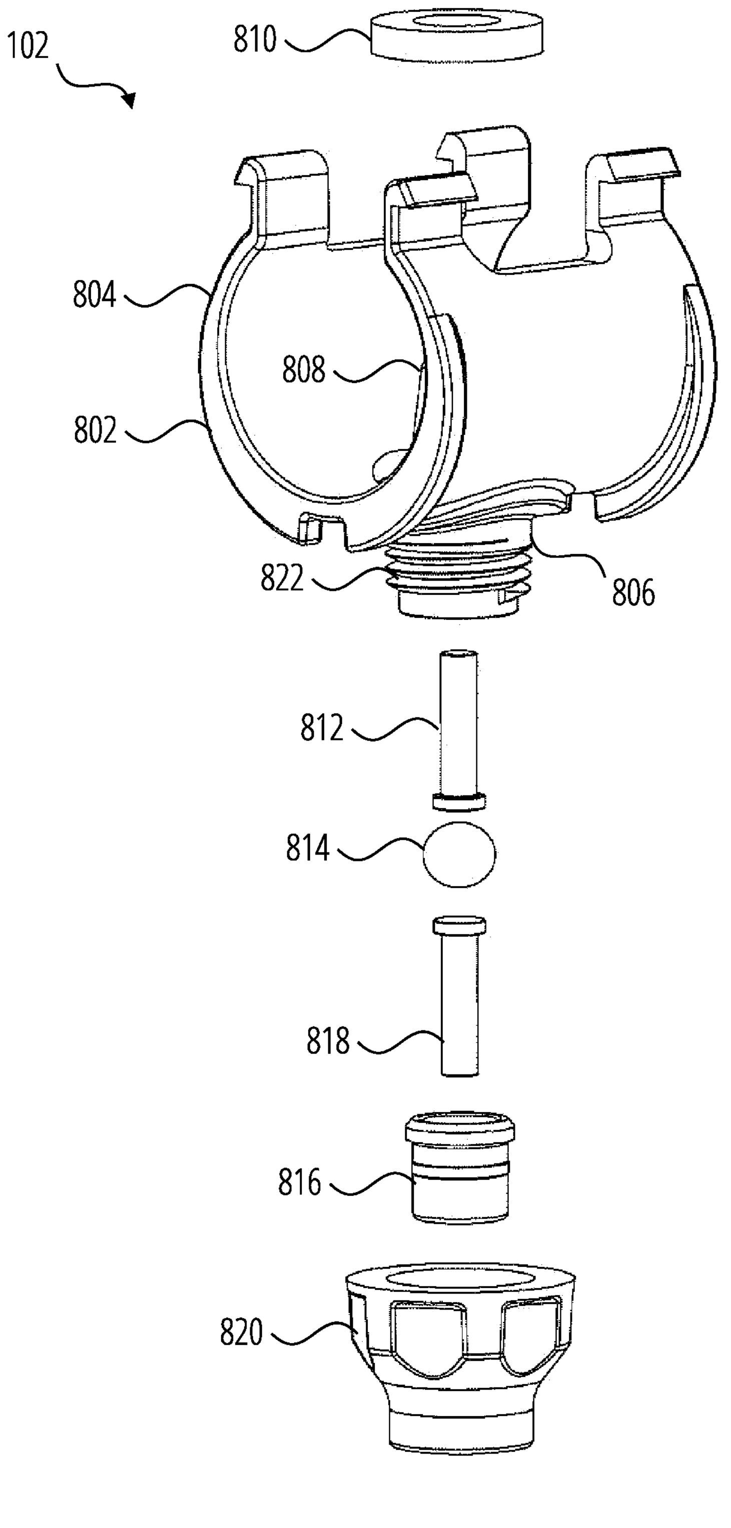
FIG. 8 illustrates an exploded view of one of the nipple drinkers of FIG. 1 in accordance with one embodiment.

Turning now to FIG. 8, an alternative embodiment of the nipple drinker 102 has a drinker body 802 that engages the watering pipe 110 to mount the nipple drinker 102 on the watering pipe. In the illustrated embodiment, the drinker body 802 has side arms 804 that at least partially wrap around the watering pipe 110. The side arms 804 hold the nipple drinker 102 securely, but detachably, against the watering pipe 110 such that each nipple drinker 102 is detachably attached to the watering pipe 110. A nipple body 806 in the lower portion of the drinker body 802 mates with and extends through an opening in the watering pipe 110 such that a nipple inlet 808 extends into the flow channel of the watering pipe 110. A waterproof sealing ring 810 aids in creating a water tight seal between the nipple body 806 and the watering pipe 110.

Extending through an interior channel of the nipple body 806 is a top pin 812 that works in conjunction with the interior channel, as will be described below, to selectively allow a flow of water out of the watering pipe 110. A sealing ball 814 is received adjacent a sealing bushing 816 that function to limit outward flow of water through the nipple drinker 102. The sealing ball 814 can be displaced from the sealing bushing 816 by a bottom pin 818 that exposed to the animal desiring to utilize the nipple drinker 102. The bottom pin 818 is configured to move the sealing ball 814 and the top pin 812 relative the nipple body 806 to open a pathway that allows water to flow through the nipple drinker 102. A fastening tip 820 surrounds and holds in place the bottom pin 818, the sealing ball 814 and the top pin 812 of the nipple drinker 102. In the illustrated embodiment, the fastening tip 820 screws onto threads 822 on the nipple body 806. Periodically, the fastening tip 820 may be removed to clean out the internals of the nipple drinker 102.

When the watering pipe 110 is pressurized, the sealing ball 814 is forced against the sealing bushing 816 thereby forming a watertight seal to prevent leakage of water from the flow channel out through the nipple drinker 102. When an animal needs to drink, the animal pecks at the bottom pin 818, thereby causing the bottom pin 818 to vertically and/or laterally displace the sealing ball 814 from the sealing bushing 816. With the sealing ball 814 temporarily separated from the sealing bushing 816, water flows along the top pin 812, around the sealing ball 814 and out the nipple drinker 102 along the bottom pin 818 to provide drinking water to the animal as would be understood by one skilled in the art.

Figure 9A:
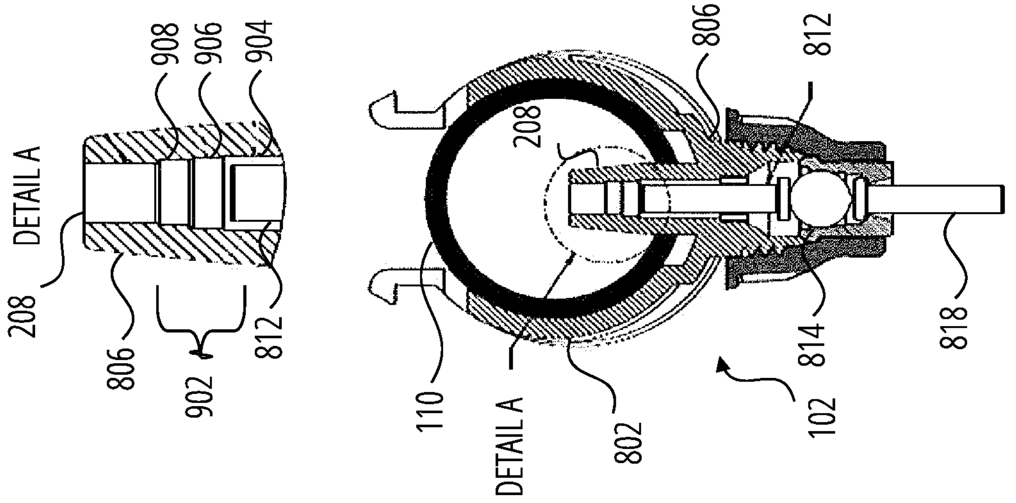
FIG. 9A illustrates a sectional view of the nipple drinker with the top pin in a first vertical position.
Figure 9B:
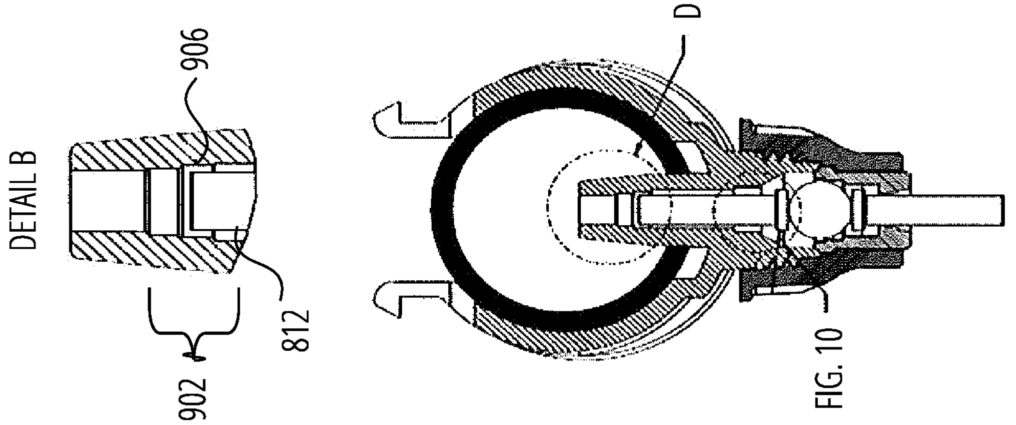
FIG. 9B illustrates a sectional view of the nipple drinker with the top pin in a second vertical position.
Figure 9C:
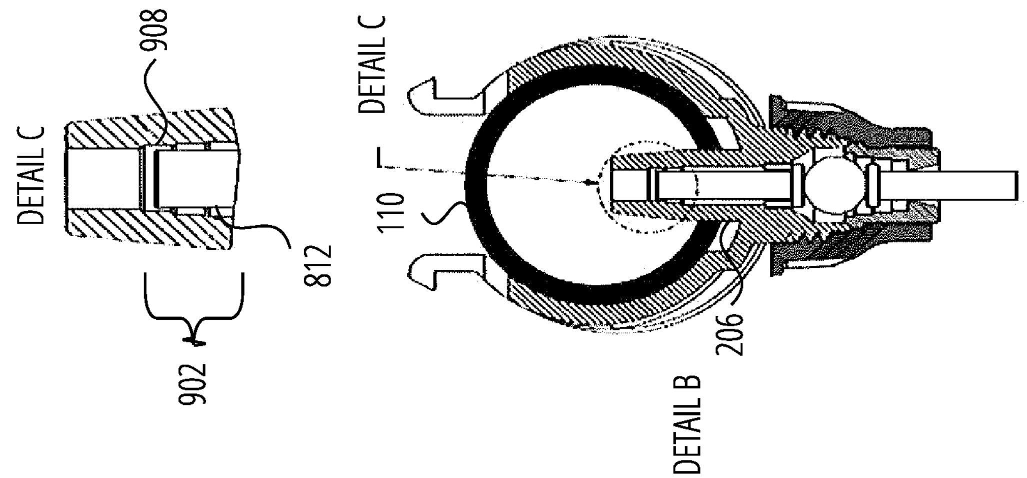
FIG. 9C illustrates a sectional view of the nipple drinker with the top pin of FIG. 3 in a third vertical position.

According to the invention, the position of the top pin 812 relative a flow control zone 902 provides different flow rates through the nipple drinker 102. FIG. 9A, FIG. 9B and FIG. 9C illustrate the nipple drinker 102 with the vertical position of the top pin 812 in three different positions relative to the flow control zone 902, which is formed in the flow passage of the nipple body 806. In this illustrated embodiment, the top pin 812 has no variation in its geometry along the portion of its length that interacts with the flow control zone 902. In the illustrated embodiment, the flow control zone 902 has a first flow feature 904, a second flow feature 906, and a third flow feature 908. When the top pin 812 is moved vertically relative the flow control zone 902, the distance between the top pin 812 and the nipple body 806 is changed, due to the diameter difference in the flow features 904, 906 and 908, changing the cross-sectional area and consequently the flow through the nipple drinker 102.

FIG. 9A illustrates the top pin 812 vertically positioned by movement of the bottom pin 818 such that the first flow feature 904 interfaces with the top pin 812 in the fluid passageway in the nipple body 806 to provide a first flow rate. As best seen in the enlarged detail A section of FIG. 9A, the first flow feature 904 has the largest diameter. Accordingly, the space between the top pin 812 and the body wall in the first flow feature 904 is the greatest and the first flowrate is correspondingly large. As perhaps better seen in the enlarged view of the detail A portion of FIG. 9A, a variation in the flow rate occurs with top pin 812 being a uniform geometry because of the variable geometry in the nipple body 806 at the flow control zone 902 that interacts with the top pin 812, resulting in the change in cross-sectional area that allows water to flow through the nipple body 806.

FIG. 9B illustrates a second condition where additional movement of the bottom pin 818 causes additional upward movement of the top pin 812 such that the second flow feature 906 in the fluid passageway in the nipple body 806 now interfaces with the top pin 812 to provide a second flow rate. As best seen in the enlarged detail B section of FIG. 9B, the second flow feature 906 has a smaller diameter than the diameter of the first flow feature 904. The space between the top pin 812 and the body wall in the second flow feature 906 is smaller than the space between the top pin 812 and the body wall in the first flow feature 904 as depicted in FIG. 9A. Accordingly, the flow channel past the second flow feature 906 allows for a second flow rate that is smaller than the first flow rate.

FIG. 9C illustrates a third condition where additional movement of the bottom pin 818 causes additional upward movement of the top pin 812 such that the third flow feature 908 now interfaces with the top pin 812 to provide a third flow rate. As best seen in the enlarged detail C section of FIG. 9C, the third flow feature 908 has a smaller diameter than the diameter of the second flow feature 906. The space between the top pin 812 and the body wall in the third flow feature 908 is smaller than the space between the top pin 812 and the body wall in the second flow feature 906. Accordingly, the flow channel past the third flow feature 908 allows for a third flow rate that is smaller than the second flow rate.

Thus, upward vertical movement of the top pin 812 causes a decrease in the flowrate through the nipple drinker 102.

Figure 10:
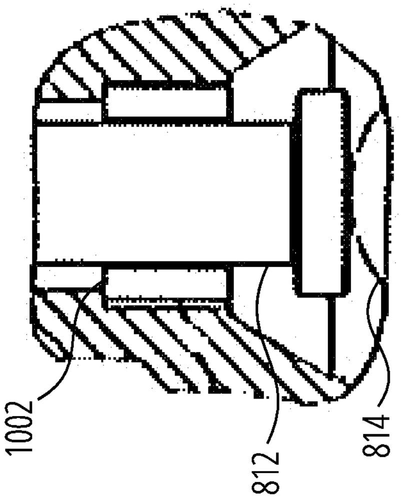
FIG. 10 illustrates an enlarged portion of FIG. 9B showing an alignment guide for the top pin.

Desirably the top pin 812 has a consistent rotational alignment in the nipple body 806. Turning also now to FIG. 10, which is an enlarged portion identified in FIG. 9B, an alignment guide 1002 maintains the alignment of the top pin 812 and keeps the top pin 812 correctly positioned, due to the dimensional difference between the diameters of the top pin 812 and the nipple body 806.

Figure 11:
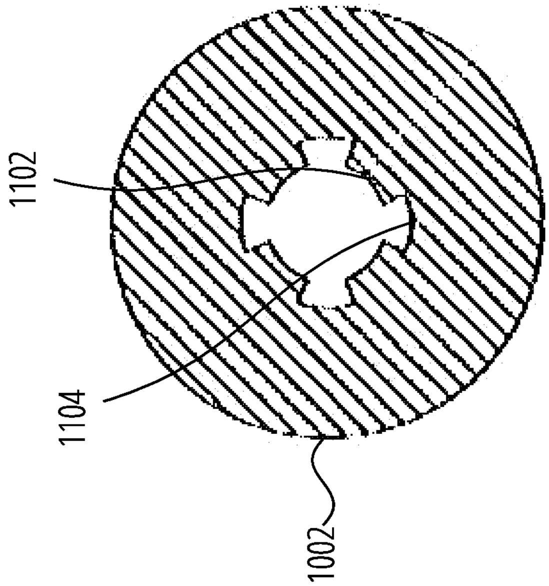
FIG. 11 illustrates a sectional view of the alignment guide of FIG. 10.

Turning also now to the sectional view in FIG. 11, the alignment guide 1002 has a plurality of positioning fingers 1102 that position the top pin 812. In order to avoid flow restrictions by the alignment guide 1002, the geometry of the alignment guide 1002 forms a plurality of flow channels 1104 interspaced between the positioning fingers 1102. In the illustrated embodiment, there are four positioning fingers 1102 separated by four channels 1104, however, other numbers of positioning fingers 1102 and channels 1104 may be used for the passage of water.

Figures 12A, 12B, 12C:
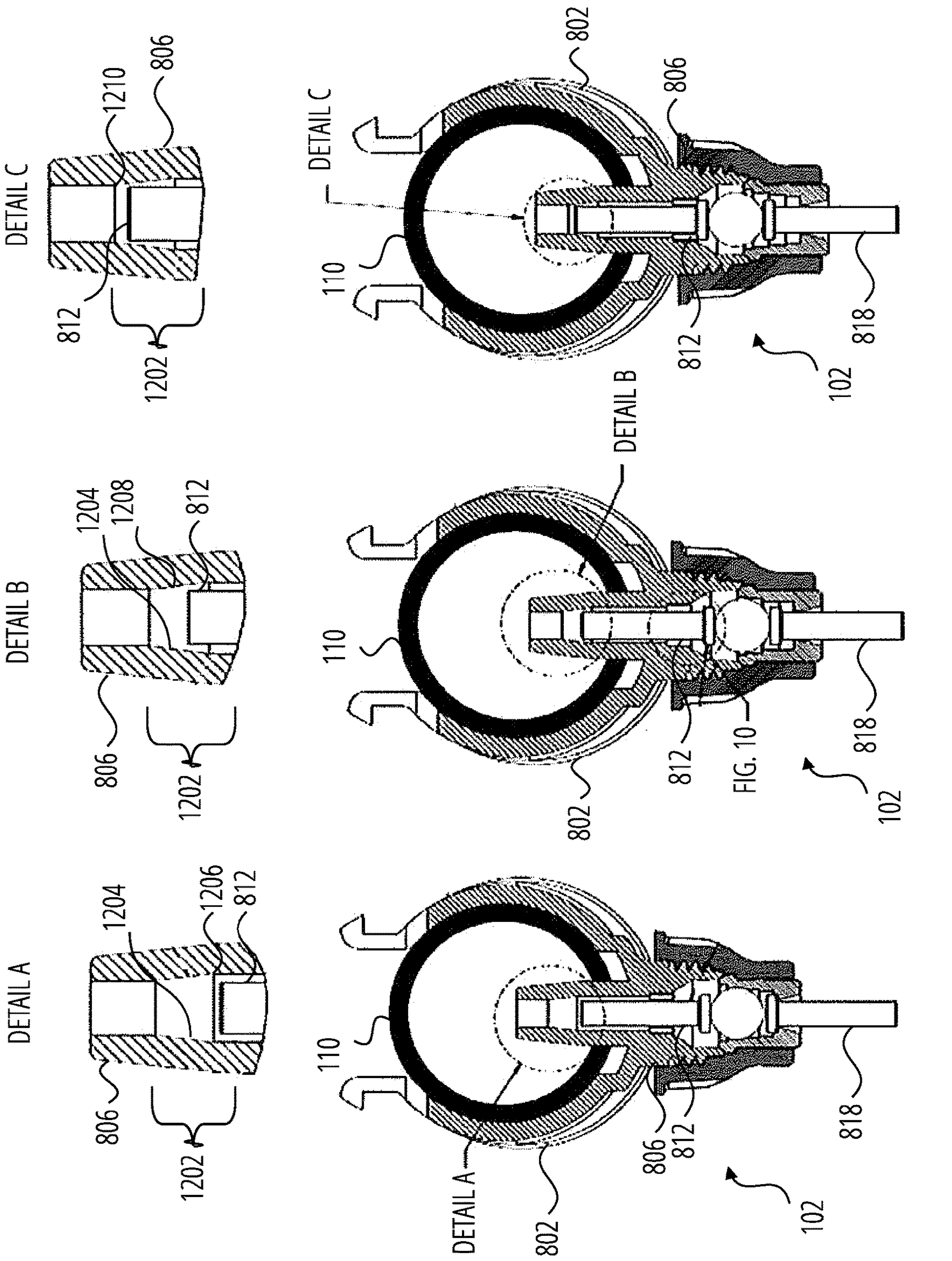
FIG. 12A illustrates a sectional view of the nipple drinker with the top pin in a first vertical position.
FIG. 12B illustrates a sectional view of the nipple drinker with the top pin in a second vertical position.
FIG. 12C illustrates a sectional view of the nipple drinker with the top pin of FIG. 3 in a third vertical position.

FIG. 12A, FIG. 12B and FIG. 12C illustrates an embodiment of the nipple drinker 102 with vertical position of the top pin 812 in three different positions such that a flow control zone 1202 in the nipple body 806 provides different flow rates through the nipple drinker 102 based on the position of the top pin 812. In this embodiment, the flow control zone 1202 has a linearly variable ramp 1204. The vertical position of the top pin 812 in the flow control zone 1202 can produce a maximum and a minimum flow, with a linear variation occurring between the two ends.

FIG. 12A illustrates the top pin 812 vertically positioned by movement of the bottom pin 818 such that the first flow feature 904 interfaces with the top pin 812 in the fluid passageway in the nipple body 806 to provide a first flow rate. As best seen in the enlarged detail A section of FIG. 12A illustrate the top pin 812 vertically positioned by movement of the bottom pin 818 such that top pin 812 interfaces with a bottom portion 1206 of the ramp 1204 in the fluid passageway in the nipple body 806 to provide a first flow rate. As best seen in the enlarged detail A section of FIG. 7A, the descending ramp 1204 has the largest diameter at the bottom portion 1206 of the flow control zone 1202, and the space between the ramp 1204 and the top pin 812 is the largest and the first flowrate is correspondingly large.

FIG. 12B illustrates a second condition where additional movement of the bottom pin 818 causes additional upward movement of the top pin 812 such that an intermediate portion of the ramp 1204 between the upper top portion 1210 and bottom portion 1206 of the ramp 1204 interfaces with the top pin 812. Since in this position the intermediate portion of the ramp 1204 adjacent the top pin 812 has a smaller diameter than the condition shown in FIG. 12A, the flow channel past the middle portion 1208 allows for a second flow rate that is smaller than the first flow rate.

FIG. 12C illustrates a third condition where additional movement of the bottom pin 818 causes additional upward movement of the top pin 812 such that a top portion 1210 of the ramp 1204 now interfaces with the top pin 812. Since the top portion 1210 of the ramp 1204 has a smaller diameter than the intermediate middle portion 1208, the flow channel past the top pin 812 allows for a third flow rate that is smaller than the second flow rate. Thus, upward vertical movement of the top pin 812 causes a decrease in the flowrate through the nipple drinkers 102.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A nipple drinker for use in a watering system of an animal house having at least one watering pipe, wherein the watering pipe carries pressurized water to the nipple drinker, the nipple drinker having a sealing mechanism forming a watertight seal to prevent leakage of water from a flow channel out through the nipple drinker and a bottom pin configured to displace the sealing mechanism to release drinking water through the nipple drinker, wherein the nipple drinker comprises:

- a nipple body that receives the sealing mechanism and the bottom pin and forms an internal flow channel from a nipple inlet and past a sealing ball when the sealing ball is displaced from a sealing bushing, wherein the nipple body forms a flow determining shelf in the internal flow channel; and
- a top pin received by the nipple body and movable in a vertical direction with respect to the nipple body, the top pin having a flow control section, with differing diameter dimensions that interface with the flow determining shelf to control the flowrate of water through the nipple drinker based on a vertical position of the top pin such that when the top pin is in a first vertical position there is a first flowrate of water and when the top pin is in a second vertical position, there is a second flowrate of water greater than the first flow rate, the flow control section of the top pin comprising one of:
  - a first flow feature having a first diameter, a second flow feature having a second diameter smaller than the first diameter, and a third flow feature having a third diameter smaller than the second diameter; or
  - a linearly variable ramp with a diameter changing linearly from a first diameter at a first end of the flow control section proximate a top of the linearly variable ramp to a second diameter smaller than the first diameter at a second end of the flow control section, the second end of the flow control section proximate the sealing ball.

2. The nipple drinker of claim 1, wherein movement of the bottom pin causes the vertical movement of the top pin.

3. The nipple drinker of claim 1, wherein the flow control section of the top pin comprises the first flow feature, the second flow feature, and the third flow feature, wherein the first flow feature, the second flow feature, and the third flow feature are vertically spaced and control an amount of water that flows through the nipple drinker.

4. The nipple drinker of claim 1, wherein the second flow feature is between the first flow feature and the third flow feature.

5. The nipple drinker of claim 1, wherein the third flow feature is closest to the sealing ball and the first flow feature is closest to the nipple inlet.

6. The nipple drinker of claim 1, wherein the top pin allows three different flowrates due to the geometry of the flow control section.

7. The nipple drinker of claim 1, wherein the flow determining shelf is formed in the nipple body so as to interact with the flow control section of the top pin in such a way as to limit a fluid passageway and thus a flowrate through the nipple drinker.

8. The nipple drinker of claim 1, wherein the top pin is positioned in the first position such that the first flow feature interfaces with the flow determining shelf, a space between the first flow feature and the flow determining shelf is the smaller than a space between the second flow feature when the top pin is positioned in the second position such that the second flow feature interfaces with the flow determining shelf.

9. The nipple drinker of claim 1, wherein the flow control section of the top pin comprises the linearly variable ramp.

10. The nipple drinker of claim 1, wherein upward vertical movement of the top pin causes an increase in a flowrate through the nipple drinker.

11. The nipple drinker of claim 1, wherein the sealing mechanism comprises a sealing ball that is forced against a sealing bushing thereby forming the watertight seal to prevent leakage of water from the flow channel out through the nipple drinker.

12. The nipple drinker of claim 1, wherein the flow control section of the top pin comprises the linearly variable ramp and is free of step changes in diameter.

13. The nipple drinker of claim 1, wherein the first flow feature is closest to the sealing ball and the third flow feature is closest to the nipple inlet.

14. A nipple drinker for use in a watering system of an animal house having at least one watering pipe, wherein the watering pipe carries pressurized water to the nipple drinker, the nipple drinker having a sealing mechanism forming a watertight seal to prevent leakage of water from a flow channel out through the nipple drinker and a bottom pin configured to displace the sealing mechanism to release drinking water through the nipple drinker, wherein the nipple drinker comprises:

a nipple body that receives the sealing mechanism and the bottom pin and forms an internal flow channel from a nipple inlet and past a sealing ball when the sealing ball is displaced from a sealing bushing, wherein the nipple body forms a flow determining shelf in the internal flow channel; and a top pin received by the nipple body and movable in a vertical direction with respect to the nipple body, the top pin having a flow control section with differing diameter dimensions that interface with the flow determining shelf to control the flowrate of water through the nipple drinker based on a vertical position of the top pin such that when the top pin is in a first vertical position there is a first flowrate of water and when the top pin is in a second vertical position, there is a second flowrate of water greater than the first flow rate, the flow control section of the top pin comprising a first flow feature having a first diameter, a second flow feature having a second diameter smaller than the first diameter, and a third flow feature having a third diameter smaller than the second diameter.

15. A nipple drinker for use in a watering system of an animal house having at least one watering pipe, wherein the watering pipe carries pressurized water to the nipple drinker, the nipple drinker having a sealing mechanism forming a watertight seal to prevent leakage of water from a flow channel out through the nipple drinker and a bottom pin configured to displace the sealing mechanism to release drinking water through the nipple drinker, wherein the nipple drinker comprises:

a nipple body that receives the sealing mechanism and the bottom pin and forms an internal flow channel from a nipple inlet and past a sealing ball when the sealing ball is displaced from a sealing bushing, wherein the nipple body forms a flow determining shelf in the internal flow channel; and a top pin received by the nipple body and movable in a vertical direction with respect to the nipple body, the top pin having a flow control section with differing diameter dimensions that interface with the flow determining shelf to control the flowrate of water through the nipple drinker based on a vertical position of the top pin such that when the top pin is in a first vertical position there is a first flowrate of water and when the top pin is in a second vertical position, there is a second flowrate of water greater than the first flow rate, the flow control section of the top pin comprising a linearly variable ramp with a diameter changing linearly from a first diameter at a first end of the flow control section proximate a top of the linearly variable ramp to a second diameter smaller than the first diameter at a second end of the flow control section, the second end of the flow control section proximate the sealing ball.

16. The nipple drinker of claim 15, wherein:

the flow control section of the top pin comprises the linearly variable ramp; and a largest diameter of the linearly variable ramp is at a top section proximate the nipple body.

17. The nipple drinker of claim 15, wherein:

the flow control section of the top pin comprises the linearly variable ramp; and a smallest diameter of the linearly variable ramp is at a bottom section proximate the sealing mechanism.

18. The nipple drinker of claim 15, wherein:

the flow control section of the top pin comprises the linearly variable ramp; and a largest diameter of the linearly variable ramp is at a bottom section proximate the sealing mechanism.

19. The nipple drinker of claim 15, wherein:

the flow control section of the top pin comprises the linearly variable ramp; and a smallest diameter of the linearly variable ramp is at a top section proximate the sealing mechanism.

* * * * *